United States Patent [19]

Makkonen et al.

[11] Patent Number: 5,594,777
[45] Date of Patent: Jan. 14, 1997

[54] WIRELESS PRIVATE BRANCH EXCHANGE SYSTEM FOR USE WITH MOBILE COMMUNICATION DEVICES

[75] Inventors: Matti Makkonen; Tapani Pökkä; Markku Lehto, all of Helsinki, Finland

[73] Assignee: Telecom Finland Oy, Helsinki, Finland

[21] Appl. No.: 392,751

[22] PCT Filed: Aug. 26, 1993

[86] PCT No.: PCT/FI93/00336

§ 371 Date: May 17, 1995

§ 102(e) Date: May 17, 1995

[87] PCT Pub. No.: WO94/05126

PCT Pub. Date: Mar. 3, 1994

[30] Foreign Application Priority Data

Aug. 26, 1992 [FI] Finland ................................. 923824
Aug. 26, 1993 [FI] Finland ................................. 933744

[51] Int. Cl.$^6$ ................................. H04Q 7/22; H04Q 7/24; H04Q 7/26
[52] U.S. Cl. ................................. 379/58; 379/59; 455/33.1
[58] Field of Search ................................. 379/58, 59, 61, 379/63, 114, 115; 455/33.1

[56] References Cited

U.S. PATENT DOCUMENTS 5,121,391   6/1992   Paneth et al. ................................. 370/95.1

*Primary Examiner*—Curtis Kuntz
*Assistant Examiner*—Nay Aung Maung
*Attorney, Agent, or Firm*—Cohen, Pontani, Lieberman, Pavane

[57] ABSTRACT

A wireless PBX system having at least one predetermined coverage area, and having a predefined group of mobile communication devices associated with each predetermined coverage area is provided. Each of the mobile communication devices belonging to a predefined group includes a first telephone number by which the mobile communication device may be reached via a wireless network, and a second, short extension number, identifying the mobile communication device as belonging to a particular group. Mobile communication devices within one of the at least one predefined groups may reach other mobile communication devices within their group or within another group by dialing the second extension number of the desired recipient mobile communication device, and may reach other communication devices not associated with any group by dialing an appropriate telephone number. In accordance with the present invention, a charging register records data about calls made by each mobile communication device and enables charging of calls at various levels depending on whether a call was placed between two mobile communication devices within a particular group, whether a call was placed between two mobile communication devices in two different groups, and whether a call was placed between a mobile communication device of a particular group to a communication device not belonging to any group.

8 Claims, 3 Drawing Sheets

WIRELESS PRIVATE BRANCH EXCHANGE SYSTEM FOR USE WITH MOBILE COMMUNICATION DEVICES

BACKGROUND OF THE INVENTION

1. Field of the Invention

The present invention relates generally to mobile communication devices, and more particularly to wireless public branch exchange systems for use with mobile communication devices.

2. Description of the Related Art

The linking of different mobile phones to a wire network dependent exchange can be realized in different ways. The EP-A-462727 presents a mobile communication telephone network linked to a PABX-network. The calls of the mobile telephone subscribers linked to the PABX-network are routed via an intelligent base station controller of the mobile telephone network. The mobile phone can be used as the PABX-extension regarding the numbering, when the mobile phone subscriber is within the coverage area of a base station controlled by a certain base station controller. The physical location of the mobile phone subscriber determines whether he can use the above-mentioned extension numbering. If the subscriber is outside a defined area, he cannot use the extension numbering.

SUMMARY OF THE INVENTION

The aim of the invention is to increase the accessibility of the PABX-group subscribers and facilitate the internal calls within the group. The extension numbering functions in mobile calls between the subscribers of the group within the whole coverage area of the network, thus combining the mobility of the mobile phone subscriber and the easiness of the extension numbering. Moreover, the internal calls within the group can be charged differently from normal calls (e.g. lower charge).

A special application of the invention is the use of wireless connections in a corporation or at a plant area, when most of the calls of the group are made within the coverage area of a certain base station or certain base stations. It would then be beneficial to the user if the call charges in this area are lower than when calling elsewhere. The subscriber's possibility to use the extension numbers in the whole coverage area of the network should still be maintained. The aim of the invention is to resolve also this problem of wireless connections to improve the accessibility of the subscribers.

The system according to the invention provides a decisive improvement of the above-mentioned disadvantages. The intention of applicant's invention is to enable predetermined mobile phone subscribers to belong to the extension numbering scheme of a PABX and to enable a charging procedure different from the normal for internal calls within the group and for calls from the corporate PABX extensions. The linking of the mobile phone subscribers to a numbering scheme of a certain PABX-group enables the internal calls between the mobile phones associated with the PABX-group and especially internal calls with the permanent extensions of the PABX. A certain group of mobile phone subscribers can be defined to utilize the services of the network in the whole coverage area of the PABX-group. The use of the internal numbering scheme is made possible within the whole network area.

The mobile phone subscriber associated with the PABX-group is connected with the PABX-extensions by dialing the extension number only. A mobile phone associated with the group can be reached at the extension number from the PABX. From the same mobile phone, contact can be taken to the public network and to the PABX can be charged separately and based on different tariffs. Calls between the mobile phone subscribers associated with the same PABX-group can be connected either by dialing the normal mobile phone number or the extension number. The charging of the mobile calls can be changed, as the calls are connected as internal PABX-group calls. The charging of the internal PABX-calls can be different from the public network calls as the internal numbering of the PABX is used.

In one embodiment of the invention, the existing mobile phone network can be utilized in a predetermined specific area. The calls within the area can be charged differently from the normal mobile phone traffic "as internal area calls". The internal calls of a certain area and the external calls of the area can be charged on different grounds.

BRIEF DESCRIPTION OF THE DRAWINGS

The invention is below described with reference to the enclosed drawing.

DETAILED DESCRIPTION OF THE PRESENTLY PREFERRED EMBODIMENT

Figure 1:
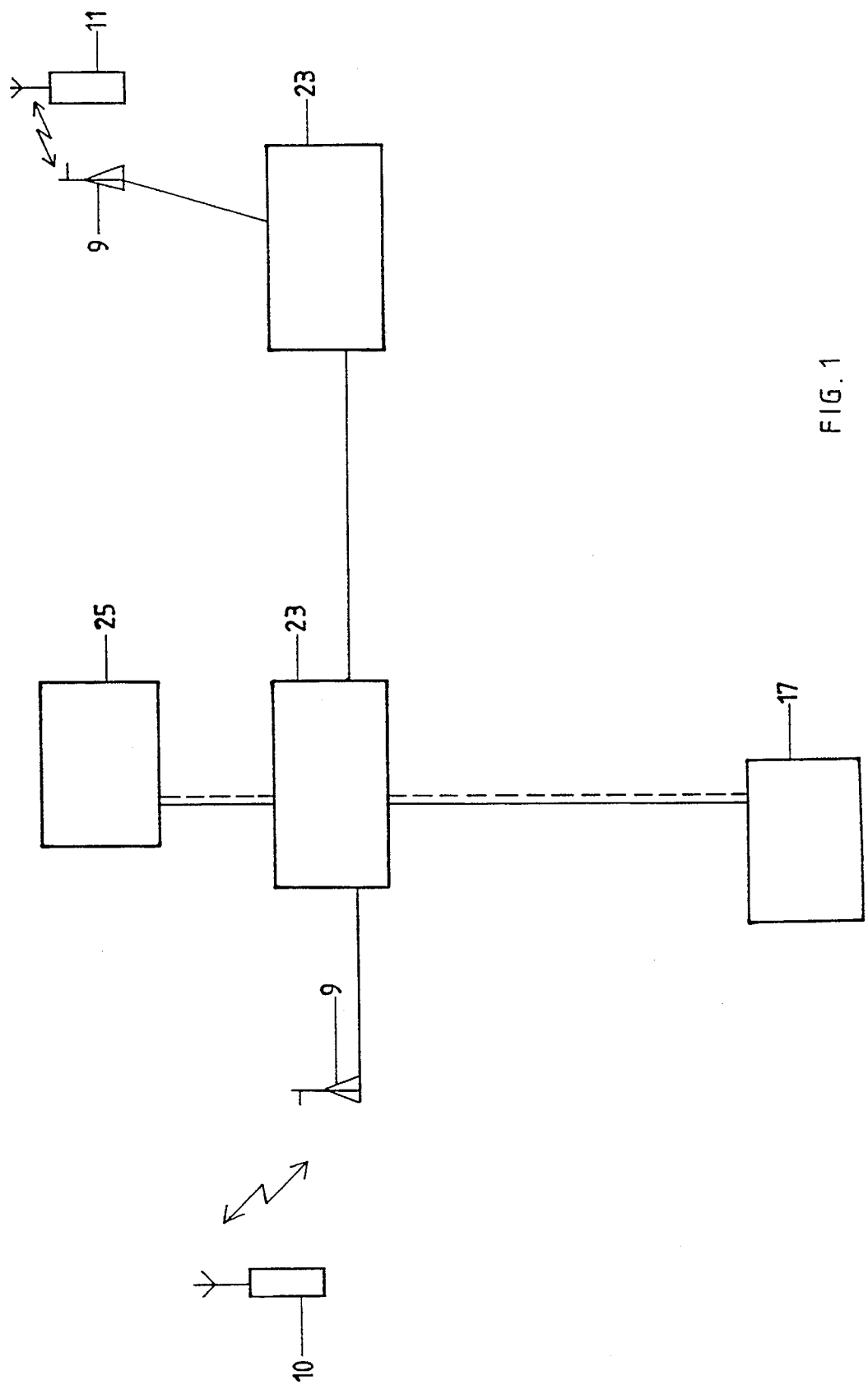
FIG. 1 presents the structure of the subject invention as a diagram.

Below is presented an example according to FIG. 1, in which the mobile phone subscriber 10 calls from the area of the mobile phone exchange 23 to another mobile phone subscriber 11 associated with a predetermined group. The dashed line marks the signaling connections between the subscriber data register and the translation table and the mobile phone, in which talk is not transmitted. When the subscriber dials the internal group extension number ABCD, the extension number and the caller's own subscriber number are transmitted in the call set-up message via the base station 9 to the mobile telephone exchange 23, by which the subscriber data register 25 connected hereto checks, based on the data received from the said message, whether the subscriber (the phone) 10 is entitled to use the internal number. If not, the call is not connected. In affirmative case, the mobile telephone exchange 23 transmits the internal number to the number translation table 17 located in the network, where the internal number is translated into the public mobile phone network subscriber number, which is transmitted back to the mobile telephone exchange 23. These translation tables can be located in many different places of the network. The mobile telephone exchange receives from the subscriber data register 25 the information about the table to which the mobile telephone exchange each time transmits the internal number to be translated. When the mobile phone exchange has discovered the public network subscriber number of the mobile phone subscriber 11, the call is routed based on the subscriber number to its destination as a normal mobile call. The mobile telephone exchange records also in the charging data of the internal call a special mark indicating an internal call for later charging treatment.

Figure 2:
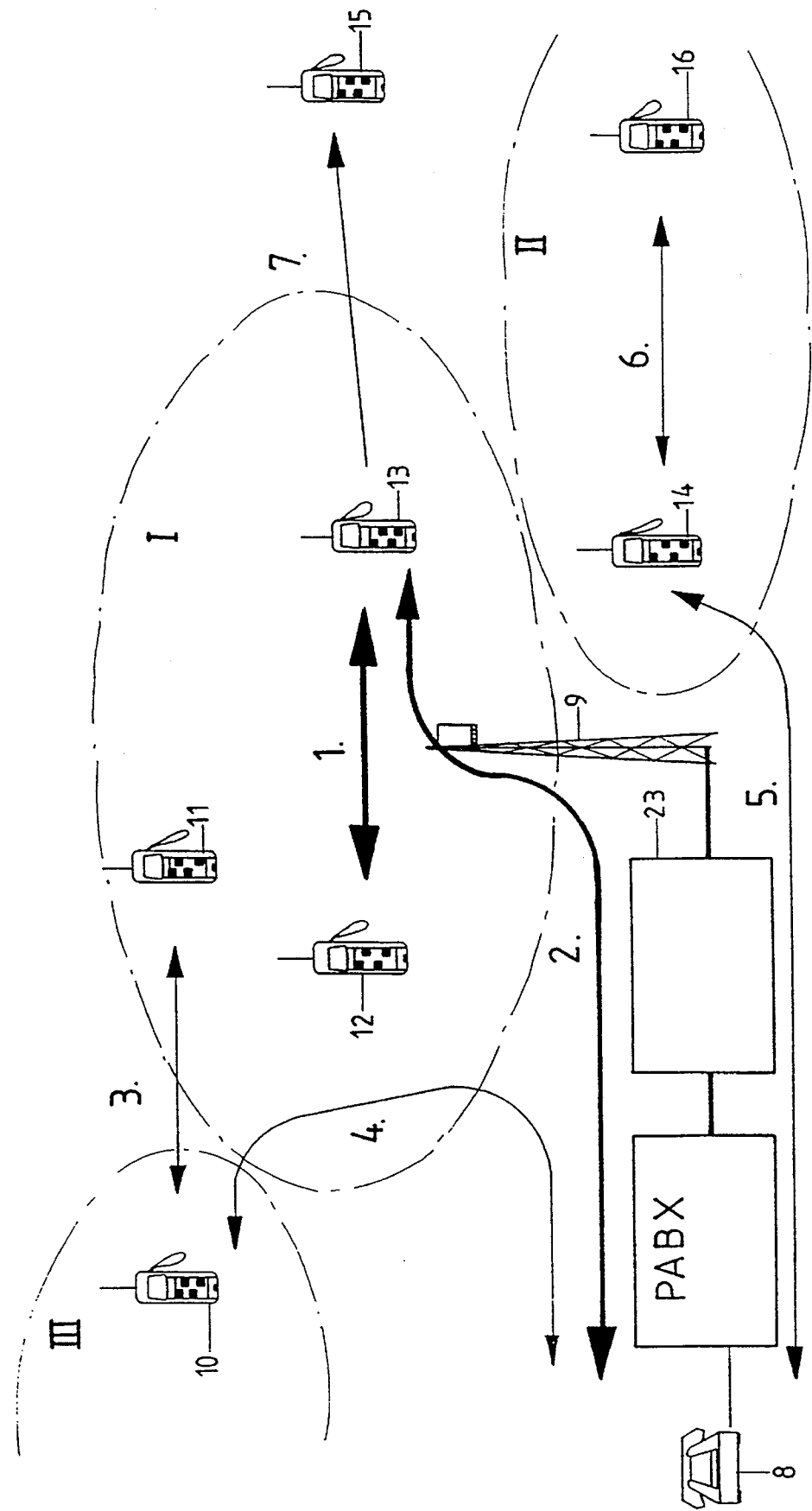
FIG. 2 illustrates the application of FIG. 1, when a PABX-group is present and when a local alternative application is used.

FIG. 2 gives a general picture of the telecommunication system using mobile telephones, with several mobile telephone stations 10–16, the base station 9, which is equipped for connection with the mobile telephones 10–16 via a radio channel, and which has a restricted circuit subscription area, a so-called cell, and which is part of the mobile phone exchange transmits the connections between the network and other telecommunication networks or the PABX, e.g. to the wire phone 8. The connections between the mobile telephones 10–16 are marked with numbers 1–7. All mobile telephones 10–16 are associated with a predetermined group, i.e. they are entitled to use the services of the group and their mobile telephone number corresponds to a short number, by which the short number corresponding to the mobile phone number is tabulated in the mobile telephone exchange translation table. The telephones 11–13 in the coverage area I of the base stations (marked with the dashed line) can between themselves make calls marked with the arrow marked by 1. In the charging data of the intercommunication between the phones 11–13, the mobile telephone exchange can record in the charging register, based on the information received from the base station, the location of these mobile phones, i.e. the cell code, to separate later on such calls that have been made from within a certain predetermined area, for a different charging treatment. Also calls via the PABX connected to the mobile telephone exchange to a certain area (e.g. area I), or calls from the area, can be separated for a later different charging treatment. The calls between the mobile phones 14 and 16, which are marked with number 6, can correspondingly be recorded as internal calls for the area II. When an area I call of the base station 9 is directed outside the area I, but still to a mobile phone associated with the predetermined internal number of the mobile exchange, e.g. 10, 14 or 15, as the connections 3, 4, 5 and 7, the internal number of the group can be used, but the location information, the cell data, of the caller and the receiver recorded in the charging register separates the call to have been made form outside or inside the area. The intercommunication of the mobile phones 14 and 16 within area H can also in the invoicing be treated differently from the intercommunication within the area I, and the calls of area III in an own way differently from the above mentioned two areas.

A call from a permanent PABX extension 8 using an internal number to a mobile phone, comes to the mobile phone exchange along a certain route and is treated as described above regarding the call of the mobile phone subscriber associated with the group. The incoming route tells the mobile phone exchange that the caller is entitled to use the internal number, as the mobile phone exchange subscriber data contains information defining the membership of the group.

A call at the group internal number from the wire phone 8 or the PABX to the mobile phone 10–16 is respectively transmitted to the subscriber data register and to the network or to the mobile phone exchange for translation of the internal number to a mobile phone number, whereafter the call is connected.

Figure 3:
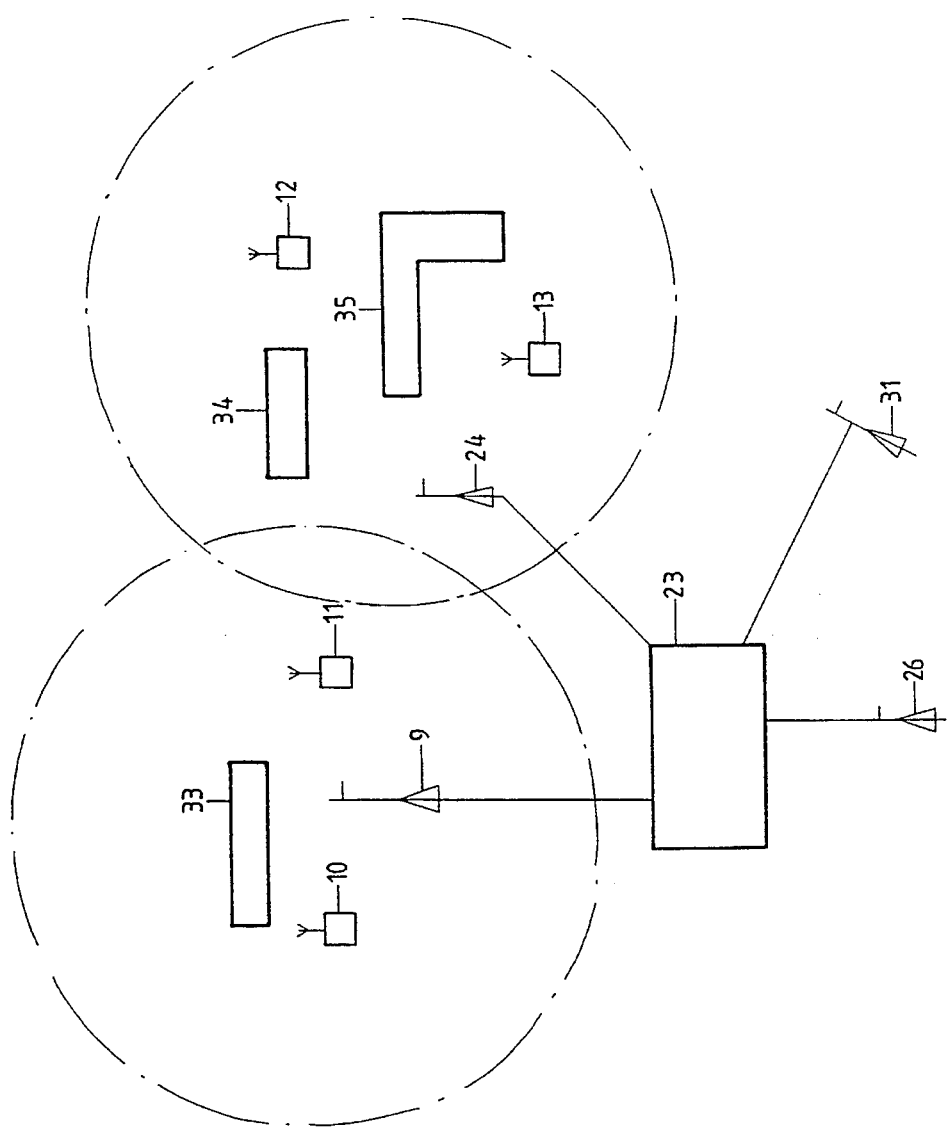
FIG. 3 presents an alternative application of FIG. 1.

FIG. 3 presents a mobile phone exchange connected to the base stations 9, 24, 26, 31. The calls transmitted via the base stations 9 and 24 between the predetermined mobile phones 10, 11, 12 and 13, can be charged differently from normal calls, because the caller and the receiver of these calls are members of a predetermined group and within a predetermined area, which data in addition to a predetermined subscriber class also is saved by the mobile phone exchange in the charging register of said calls. The mobile phone subscriber 13 can also be associated with a predetermined group, entitled to use internal numbers, but not the area services. Thus a call between the mobile phones 12 and 13 can be made at the internal number, but though both phones are within the predetermined area, the invoicing does not differ from the invoicing of an internal call, because the charging data of the call contains the record that one of the callers is not associated with the group of the predetermined local service. The phones associated with a mobile phone group of the predetermined area service are a subset of a mobile phone group using predetermined internal numbers. The PABX with its fixed extensions can always be defined to be associated with the local service group, by which calls from/to the PABX, otherwise meeting the provisions that a caller and receiver of a predetermined group are located in a predetermined area, are local calls. The coverage areas of the base stations are marked with dashed lines and buildings inside these are marked with numbers 33, 34 and 35 illustrating e.g. plant site buildings. The calls connected via the base stations 24, 31 are not area calls limited by the dashed lines and therefore not treated differently from other internal numbering calls, because the cell codes saved in the charging register differ from the cell data of the predetermined area.

Each mobile phone station located within a certain base station cell and having an active connection, is in contact with the base station by a radio connection. One cell can contain several mobile phone stations having an active connection and which therefore are connected with the same base station.

When making a call with a mobile phone, the base station is in connection with the mobile phone exchange, from where the call is routed to the desired number. According to the invention, the group internal number of an incoming call to the mobile phone exchange is translated into the receiver's long number and transmitted via the base station to the receiver.

The caller's subscriber data is checked to verify that he is entitled to use the group internal number. Moreover, the mobile phone exchange adds to the charging data of the call, the location data of the caller and the receiver for later checking in the charging procedure whether the call has been made within a certain predetermined area, by which the call is treated differently from the normal charging procedure. The register available to the mobile phone exchange contains information about the subscribers entitled to use the short numbers and/or those when calling a subscriber within a certain area, can be separated as calls to be charged differently.

In the NMT-system, the base stations are connected to the mobile phone exchange with permanent connections. The mobile phone exchange knows therefore the route of a predetermined subscriber call, wherefore the area can be defined to a certain base station or certain base stations. In the GSM-system e.g. the base station informs in connection with the call-set-up message its own base station identity, from which the mobile phone exchange identifies the base station area of the call. When the charging data contains information about the making and the receiving of the calls, the calls can later be separated in the charging procedure according to the location of the caller and the receiver at the time of the call.

Mobile phone subscribers of a predetermined PABX-group can communicate as PABX-extensions. A mobile phone MS associated with the PABX-group makes the connection with the PABX extensions by dialing the extension number only. Calls from the PABX to the mobile phone MS associated with the PABX are correspondingly made by using the group internal number like the PABX extension number. The connection from the mobile phone MS to the public network is made from the mobile phone network in the normal way.

The calls are routed from the mobile phone MS to the PABX when the subscriber dials the PABX extension number, i.e. the group internal number or the operator's calling number. The mobile phone exchange identifies the mobile phone MS to be associated with the PABX-group based on the data contained in the subscriber data register, translates the internal number into a public network number and routes the call to the PABX.

When the mobile phone MS is called from the PABX extension number, i.e. the group internal number by using the mobile phone MS number, belonging to the numbering scheme reserved for the PABX group, or a special identification number or the PABX extension number, the PABX connects the call to the mobile phone exchange route and transmits to the mobile phone exchange the number dialed by the subscriber without the possible identification number. With the translation table selected on basis of the location, the mobile phone exchange can translate the number into the normal mobile phone number of the called mobile phone MS based on the data contained in the table.

The intercommunication possibilities between two mobile phones MS associated with the same PABX-group are e.g. a connection also by using the mobile phone number, a call from the mobile phone MS to the public network, e.g. the usual way: the area code and the number. The call from the public network to the mobile phone MS can be made either by using the normal mobile phone number or the PABX number.

The numbering scheme can e.g. be selected as follows, when the pre-dialed numbers have the following significance:

| | |
|---|---|
| 0 | emergency and service numbers staring with 0 |
| 11 | PABX operator |
| 1x | (x<>1) PABX extension numbers |
| 2 . . . 8 | PABX extension numbers |
| 9 | communication to the public network. |

The PABX-group mobile phones MS are generally given own number series (e.g. total 10- and 100-groups), of which numbers are not given to the permanent extensions. The access numbers of the mobile phones MS can start with e.g. the numbers 2 . . . 8, which are treated as internal numbers in the charging procedure.

The PABX-group mobile phones MS are numbered so that e.g. the normal extension is given a bilobate business group prefix to indicate that the phone is a mobile phone MS. Thus the subscriber can have the same number both for the permanent phone and for the mobile phone MS, by which the group internal numbers differ only regarding the business group number.

The PABX comprises a group of subscribers, who are able to intercommunicate by using certain defined internal numbers, which are independent of the public network numbering. To its function the group is a normal subscriber PABX. The PABX-group consists of a PABX/PABX-network subscription and a number of mobile phone subscribers. The public network subscribers can be members of the PABX-group. The public network subscriber group can consist of a PABX, a PABX network and separate subscribers. The ordinary subscriber number of the individual subscriber of the group is independent of the other subscribers' numbering. An internal short numbering scheme independent of the telephone network list numbering is defined for the PABX-group.

The charging data of internal calls of the PABX-group mobile phones are separated from the other calls and different current tariffs can be defined for them. Metering pulses can be sent to the PABX connected directly to an own route of the mobile phone exchange. The PABX can be connected to the mobile phone exchange being the home MSC of several mobile phones. The digital PABX can be connected to the mobile phone exchange, e.g. with a permanent n×2 Mbit/s-route or e.g. demi-fixed n×64 kbit/s-route via the public phone net PSTN, via which routes the talk can be transmitted in the network. In these cases, the interface between the mobile phone exchange and the PABX is regarding the mobile phone exchange the normal phone network interface and regarding the PABX the normal direct-dialing-in route.

In the home MSC, the normal data register of the subscriber associated with the PABX-group, contains in addition to the subscriber data the PABX-group table index, which expresses that the subscriber belongs to the PABX-group. The index data gives the right to use the PABX-group internal communication. Each PABX-group has an own PABX-group table or depending on the case, also several chained PABX-group tables, which can be grouped so that the permanent subscribers of the PABX or the PABX-network are placed in their own tables and the mobile phones of the PABX-group and others (e.g. public network phones) in their own tables. The tables contain subscriber information by group as well as a list of the group subscribers. The subscriber data index indicates the group table/table group. The subscriber lists of the PABX-group contain the internal group short numbers, the subscribers own number and the external call restriction data.

The subscriber list of the PABX-group tables contains the subscriber's internal short number and the subscriber's long number as normally dialed and the subscriber's external call restriction data.

In the visited MSC, when the PABX-group subscriber is in the visited MSC area, the normal subscriber data as well as the subscriber class and the external area code "associated with the PABX-group" are updated in the subscriber register. The subscriber class, which information defines the group membership in the subscriber register, contains the information enabling the abbreviated dialing. External calls can also be barred.

The subscriber group can be expanded by ordinary public network subscribers by adding the subscriber's number data (internal and subscriber number) into the PABX-group table.

With the arrangements of the subject invention the services offered by the PABX can be utilized by the mobile phones.

It is also obvious that several mobile phone exchanges and/or PABX can be linked to the PABX-group.

The invention has above been described with reference to only one favorable form of application. The solutions presented above and in the drawings are examples, and are not to be considered as so limited, but all modifications within the scope of the inventive idea defined by the patent claims are naturally applicable.

We claim:

1. A wireless private branch exchange system for use with a first plurality of mobile communication devices associated with a wireless network, and a second plurality of communication devices operable to communicate with the wireless network, each communication device of the first plurality of mobile communication devices and the second plurality of communication devices having a first unique identification number representative of a public exchange number, said wireless private branch exchange system comprising:

first control means operable to define, for each of the first plurality of mobile communication devices, a second unique identification number representative of a private branch exchange extension number, shorter than said first identification number;

communication control means, connected to said first control means and to the wireless network, operable to define a predetermined coverage area, to control and identify wireless communication between each mobile communication device of the first plurality of mobile communication devices within said predetermined coverage area via the wireless network, and to enable and identify communication between the first plurality of mobile communication devices and the second plurality of communication devices via the wireless network, such that:

when a first mobile communication device of the first plurality of mobile communication devices located within said coverage area transmits, to said communication control means, a unique second identification number associated with a second mobile communication device of the first plurality of mobile communication devices, also within said coverage area, said communication control means connects said first and second mobile communication devices via the wireless network to enable communication therebetween, and asserts a first signal indicative of an internal communication, and when said first mobile communication device of the first plurality of mobile communication devices transmits, to said communication control means, a unique first identification number associated with a third communication device of the second plurality of communication devices, said communication control means connects said first mobile communication device to the wireless network to enable communication with said third communication device, and asserts a second signal indicative of an external communication; and first register means, connected to said communication control means, operable to provide a record of internal wireless communications within the first plurality of mobile communication devices by recording said first signal for each instance of said internal wireless communication by each mobile communication device of the first plurality of mobile communication devices, and to provide a record of external wireless communications between the first plurality of mobile communication devices and the second plurality of communication devices by recording said second signal for each instance of said external wireless communication by each mobile communication device of the first plurality of mobile communication devices.

2. The wireless private branch exchange system of claim 1 wherein said communication control means comprises:

a base station means having a predetermined communication range and being positioned in a predetermined location, said base station means being operable to communicate with the first plurality of mobile communication devices within said communication range via the wireless network and to assert a third signal indicative of said predetermined location when said communication occurs; and mobile communication exchange means, connected to said base station means and to the wireless network, operable to route said internal communication between each mobile communication device of the first plurality of mobile communication devices via the wireless network, to route said external communication between the first plurality of mobile communication devices and the second plurality of communication devices via the wireless network, and operable to receive said third signal from said base station when one of said internal and external wireless communication is initiated by a mobile communication device of the first plurality of mobile communication devices from within said predetermined area, whereby said first register means is further operable to record said third signal for each instance of said internal and external wireless communication by each mobile communication device of the first plurality of mobile communication devices from within said predetermined area.

3. The wireless private branch exchange system of claim 2 wherein said communication control means further comprises:

a plurality of additional base station means, connected to said mobile communication exchange means, each of said plurality of additional base station means being positioned in a unique predetermined location, and having a predetermined communication range, each of said plurality of additional base station means being operable to communicate with the first plurality of mobile communication devices within said communication range via the wireless network and to assert said third signal indicative of said unique predetermined location when said communication occurs;

second control means, connected to said first control means and to said mobile communication exchange means, operable to:

partition the first plurality of mobile communication devices into a plurality of groups, each group of said plurality of groups comprising at least one mobile communication device, to associate each group of said plurality of groups with a predetermined base station means of said plurality of base station means, to assert a fourth signal when said internal wireless communication occurs within a particular group of said plurality of groups, and to assert a fifth signal when said internal wireless communication occurs between any two groups of said plurality of groups; and whereby said first register means is further operable to record said fourth and fifth signals for each instance of said internal wireless communication by each mobile communication device of the first plurality of mobile communication devices.

4. The wireless private branch exchange system of claim 1 further comprising:

means operable to define at least one mobile communication device, from the plurality of mobile communication devices, to be prevented from initiating external wireless communication with the second plurality of communication devices; and means operable to prevent said at least one defined mobile communication device from initiating external wireless communication with the second plurality of communication devices.

5. The wireless private branch exchange system of claim 3 further comprising second register means, connected to said mobile communication exchange means, operable to store, for each mobile communication device of the first plurality of mobile communication devices, subscriber data indicative of said first and second unique identification numbers for said mobile communication device, indicative of information about a user of said mobile communication device, and indicative of the particular group of said plurality of groups to which said mobile communication device belongs, wherein when a second unique identification number associated with a particular mobile communication device of said plurality of mobile communication devices, is received by said mobile communication exchange means via a base station associated with a particular group to which said particular mobile communication device belongs, said mobile communication exchange means accesses said second register, determines, from said second unique identification number, said first unique identification number associated with said particular mobile communication device, and initiates internal wireless communication with said particular mobile communication device by dialing said first unique identification number over said wireless network.

6. The wireless private branch exchange system of claim 5 further comprising charging register means, connected to said first and second registers, operable to determine a monetary charge for each instance of internal and external wireless communication by each mobile communication device of the first plurality of mobile communication devices, based on at least one of said first, second, third, fourth, and fifth signals recorded in said first register for the particular mobile communication device, and based on said subscriber data stored in the second register of the particular mobile communication device, wherein said monetary charge for said internal communication is lower than for said external communication.

7. The wireless private branch exchange system of claim 1 wherein the second plurality of communication devices comprises at least one mobile communication device.

8. The wireless private branch exchange system of claim 1 further comprising connection means operable to connect the wireless private branch exchange system to at least one other private branch exchange system.

* * * * *